(12) United States Patent
Kanesalingam

(10) Patent No.: US 9,226,266 B2
(45) Date of Patent: Dec. 29, 2015

(54) METHOD FOR DETERMINING DELAY PARAMETERS FOR USER DATA FLOW SYNCHRONIZATION FOR EMBMS

(71) Applicant: Telefonaktiebolaget L M Ericsson (publ), Stockholm (SE)

(72) Inventor: Prabaharan Kanesalingam, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 124 days.

(21) Appl. No.: 14/016,986

(22) Filed: Sep. 3, 2013

(65) Prior Publication Data

US 2015/0063188 A1   Mar. 5, 2015

(51) Int. Cl.
| | |
|---|---|
| H04H 20/71 | (2008.01) |
| H04W 72/00 | (2009.01) |
| H04L 12/18 | (2006.01) |
| H04W 4/06 | (2009.01) |
| H04W 92/14 | (2009.01) |

(52) U.S. Cl.
CPC .......... *H04W 72/005* (2013.01); *H04L 12/1881* (2013.01); *H04L 12/189* (2013.01); *H04W 4/06* (2013.01); *H04W 92/14* (2013.01)

(58) Field of Classification Search
None
See application file for complete search history.

(56) References Cited

U.S. PATENT DOCUMENTS

| | | | |
|---|---|---|---|
| 2006/0146745 A1 | 7/2006 | Cai et al. | |
| 2007/0171853 A1* | 7/2007 | Jones et al. | 370/328 |
| 2008/0101270 A1* | 5/2008 | Kekki | H04W 72/005 370/312 |
| 2008/0311949 A1* | 12/2008 | Koskinen | H04W 72/005 455/525 |
| 2009/0080406 A1 | 3/2009 | Gopal et al. | |
| 2009/0116433 A1* | 5/2009 | Motegi | H04W 56/0015 370/329 |
| 2009/0141646 A1 | 6/2009 | Legg | |
| 2009/0253435 A1* | 10/2009 | Olofsson | H04W 72/0406 455/450 |
| 2010/0046409 A1* | 2/2010 | Lohmar | H04L 12/1868 370/312 |
| 2010/0173636 A1* | 7/2010 | Gao | H04W 28/00 455/447 |
| 2012/0069785 A1* | 3/2012 | Zhang | H04W 72/121 370/312 |

(Continued)

FOREIGN PATENT DOCUMENTS

| | | | |
|---|---|---|---|
| EP | 1643784 A1 | 4/2006 | |
| EP | 1991013 A1 | 11/2008 | |

(Continued)

OTHER PUBLICATIONS

Wang et al., "LTE MBMS Sync Protocol for Support Synchronisation of Content", 2009, IEEE, All Pages.*

(Continued)

*Primary Examiner* — Otis L Thompson, Jr.
(74) *Attorney, Agent, or Firm* — Withrow & Terranova, PLLC

(57) ABSTRACT

In order to calculate a delay parameter for synchronized data transmission in a cellular communications network, a service center transmits a message to a base station including a transmission time. Upon receipt of the message, the base station determines a time of receipt of the message. A delay parameter is then determined by the base station as the difference between the time of receipt and the time of transmission. In one embodiment, the delay parameter is transmitted back to the service center by the base station.

26 Claims, 9 Drawing Sheets

(56) References Cited

U.S. PATENT DOCUMENTS

| | | | | |
|---|---|---|---|---|
| 2012/0099468 | A1* | 4/2012 | Wang et al. | 370/252 |
| 2012/0155282 | A1* | 6/2012 | Dorenbosch | H04W 72/005 370/241.1 |
| 2012/0182923 | A1* | 7/2012 | Huang | H04W 72/005 370/312 |
| 2012/0281614 | A1* | 11/2012 | Deng et al. | 370/315 |
| 2012/0287838 | A1* | 11/2012 | Zhang et al. | 370/312 |
| 2013/0003578 | A1* | 1/2013 | Hu | H04W 24/00 370/252 |
| 2013/0114497 | A1* | 5/2013 | Zhang | H04W 72/005 370/312 |
| 2013/0170357 | A1* | 7/2013 | Anchan et al. | 370/237 |
| 2013/0258933 | A1* | 10/2013 | Moon | H04W 4/06 370/312 |
| 2014/0325580 | A1* | 10/2014 | Lohmar | H04W 4/06 725/116 |
| 2015/0055541 | A1* | 2/2015 | Zhang | H04W 72/005 370/312 |

FOREIGN PATENT DOCUMENTS

| | | |
|---|---|---|
| EP | 2109263 A1 | 10/2009 |
| EP | 2180651 A1 | 4/2010 |
| EP | 1864534 B1 | 5/2010 |
| EP | 2352347 A1 | 8/2011 |
| WO | 2011063736 A1 | 6/2011 |
| WO | 2012115726 A1 | 8/2012 |
| WO | 2013066564 A2 | 5/2013 |

OTHER PUBLICATIONS

Alexiou, A. et al., "Efficient Assignment of Multiple E-MBMS Sessions towards LTE," Wireless and Mobile Networking, IFIP Advances in Information and Communication Technology, vol. 308, Sep. 2009, pp. 240-250.

Author Unknown, "Technical Specification Group Radio Access Network; MBMS synchronisation protocol (SYNC)," 3GPP, Technical Specification 25.446, 3GPP Organizational Partners, Sep. 2012, Version 11.0.0, 22 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP, Technical Specification 36.300, 3GPP Organizational Partners, Dec. 2012, Version 10.9.0, 194 pages.

Author Unknown, "Technical Specification Group Radio Access Network; Evolved Universal Terrestrial Radio Access Network (E-UTRAN); M3 Application Protocol (M3AP) (Release 11)," 3GPP, Technical Specification 36.444, 3GPP Organizational Partners, Dec. 2012, Version 11.4.0, 63 pages.

Author Unknown, "LTE eMBMS Technology Overview," Qualcomm Research, QUALCOMM Incorporated, Nov. 2012, San Diego, California, 18 pages.

Christophorou, C. et al., "An Enhanced Approach for Efficient MBMS Handovers in 3G Networks," IEEE Symposium on Computers and Communications, Jul. 6-9, 2008, Marrakech, Morocco, 6 pages.

Richards, D. et al., "Network/Content Synchronisation for MBSFN Transmission in 3GPP Networks," The 5th International Telecommunications Synchronisation Forum, Nov. 13-15, 2007, London, UK, 17 pages.

International Search Report and Written Opinion for PCT/IB2014/064205, mailed Jan. 28, 2015, 13 pages.

* cited by examiner

METHOD FOR DETERMINING DELAY PARAMETERS FOR USER DATA FLOW SYNCHRONIZATION FOR EMBMS

FIELD OF THE DISCLOSURE

The present disclosure relates to methods for determining delay parameters for user data flow synchronization in Multimedia Broadcast and Multicast Services (MBMS).

BACKGROUND

Multimedia Broadcast and Multicast Services (MBMS) is a broadcasting service offered via cellular communications networks. MBMS is a point-to-multipoint service in which user data is transmitted from a single source entity to multiple recipients. Some exemplary applications of MBMS include file downloads and streaming type services (e.g., mobile television). Enhanced MBMS (eMBMS) is a term used to denote MBMS applications for evolved network systems such as Long Term Evolution (LTE) cellular communications networks.

Data transmission for eMBMS may be accomplished using a MBMS Single Frequency Network (MBSFN). A MBSFN includes multiple network cells all transmitting identical waveforms at the same time. The multiple transmissions are seen by a wireless device on the same network as a single transmission. Accordingly, the wireless device can combine eMBMS transmissions from multiple cells. Transmitting the same data to multiple recipients via eMBMS allows network resources to be shared, thereby improving the efficiency of a wireless communications network in which eMBMS is implemented.

Often, the network cells used in a MBSFN are spread out over multiple base stations. Accordingly, a synchronization process must be performed to ensure that each network cell simultaneously transmits an identical waveform. Generally, such a synchronization process is implemented using an MBMS synchronization protocol (SYNC) administered between a Broadcast Multicast Service Center (BM-SC) and the base stations serving the network cells. The BM-SC acts as an intermediary between a content provider and the base stations in order to facilitate the synchronized transmission of data. According to conventional MBMS SYNC solutions, the BM-SC transmits data in the form of SYNC Protocol Data Units (PDUs). Each SYNC PDU has a corresponding MBMS SYNC time stamp that indicates a time at which the data included in the SYNC PDU is to be transmitted by the base stations in the MBSFN.

One issue with the MBMS SYNC protocol is that the MBMS SYNC timestamps for the SYNC PDUs must account for delays between the BM-SC and the base stations. Conventional solutions fail to provide an accurate way of obtaining the delays between the BM-SC and the base stations in the MBSFN. Although rough estimation can be used to determine the delays, doing so has a large impact on the performance of the cellular communications network. If the estimates of the delays are not long enough, data arrives too late (e.g., too late for transmission of the time indicated by the timestamp) at one or more of the base stations in the MBSFN and is dropped as a result. If the estimates of the delays are too long, an excessive amount of data must be buffered at one or more of the base stations.

One solution proposed in European Patent serial number EP2180651 (A1) describes using a default delay parameter that is long enough to ensure that user data has enough time to reach each base station in the MBSFN before data transmission occurs. However, the use of default delay parameters often results in inefficient over-provisioning, wherein the delay is over-estimated to ensure that user data is not dropped at any of the base stations.

Accordingly, there is a need for an accurate way to determine a delay between the MB-SC and the base stations in a MBSFN to enable synchronized transmission of data in the MBSFN.

SUMMARY

The present disclosure relates to methods for calculating a delay parameter for a delay, or latency, between a service center and a base station in order to enable synchronized transmission of data in a cellular communications network using Multimedia Broadcast Multicast Services (MBMS). According to one embodiment, a service center transmits a message to a base station including a transmission time. Upon receipt of the message, the base station determines a time of receipt of the message. A delay parameter is then determined by the base station as the difference between the time of receipt and the time of transmission. In one embodiment, the delay parameter is transmitted to the service center by the base station.

According to one embodiment, the service center comprises a communications subsystem and a processing subsystem. The processing subsystem is associated with the communications subsystem and is configured to transmit the message including the transmit time from the service center to the base station via the communications subsystem.

According to one embodiment, the service center is a Broadcast Multicast Service Center (BM-SC) for use in an eMBMS system. The transmission time may be provided by the service center in an eMBMS SYNC Protocol Data Unit (PDU), either in an extension field of the eMBMS SYNC PDU, or as a non-standard eMBMS SYNC PDU. According to an additional embodiment, the transmission time may be provided by the service center in a Long Term Evolution (LTE) M3 control message.

According to another embodiment, the transmission time and the time of receipt are based on a common relative time source between the service center and the base station. Further, in one embodiment, an initial delay parameter for the transmission delay between the service center and the base station may be set to zero such that the an eMBMS SYNC timestamp associated with the delay parameter and included in the message is the transmission time. According to an additional embodiment, the transmission time and the time of receipt are based on an absolute time source, such as a global positioning services (GPS) clock.

According to one embodiment, the base station comprises a communications subsystem, a radio subsystem, and a processing subsystem. The processing subsystem is associated with the communications subsystem and the radio subsystem, and is configured to receive the message including the transmission time from the service center via the communications subsystem. The processing subsystem then determines the time of receipt of the message, and subsequently determines a delay parameter based on the transmit time and the time of receipt. Finally, the processing subsystem transmits the delay parameter to the service center via the communication subsystem.

According to one embodiment, the base station is an enhanced node B (eNB) for use in an LTE cellular communications network. The transmission time may be provided to the base station in an eMBMS SYNC Protocol Data Unit (PDU), either in an extension field of the eMBMS SYNC PDU, or as a non-standard eMBMS SYNC PDU. According to an additional embodiment, the transmission time may be provided to the base station in an LTE M3 control message.

According to another embodiment, the transmission time and the time of receipt are based on a common relative time source between the service center and the base station. Further, in one embodiment, an initial delay parameter for the transmission delay between the service center and the base station may be set to zero such that the an eMBMS SYNC timestamp associated with the delay parameter and included in the message is the transmission time. According to an additional embodiment, the transmission time and the time of receipt are based on an absolute time source, such as a global positioning services (GPS) clock.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
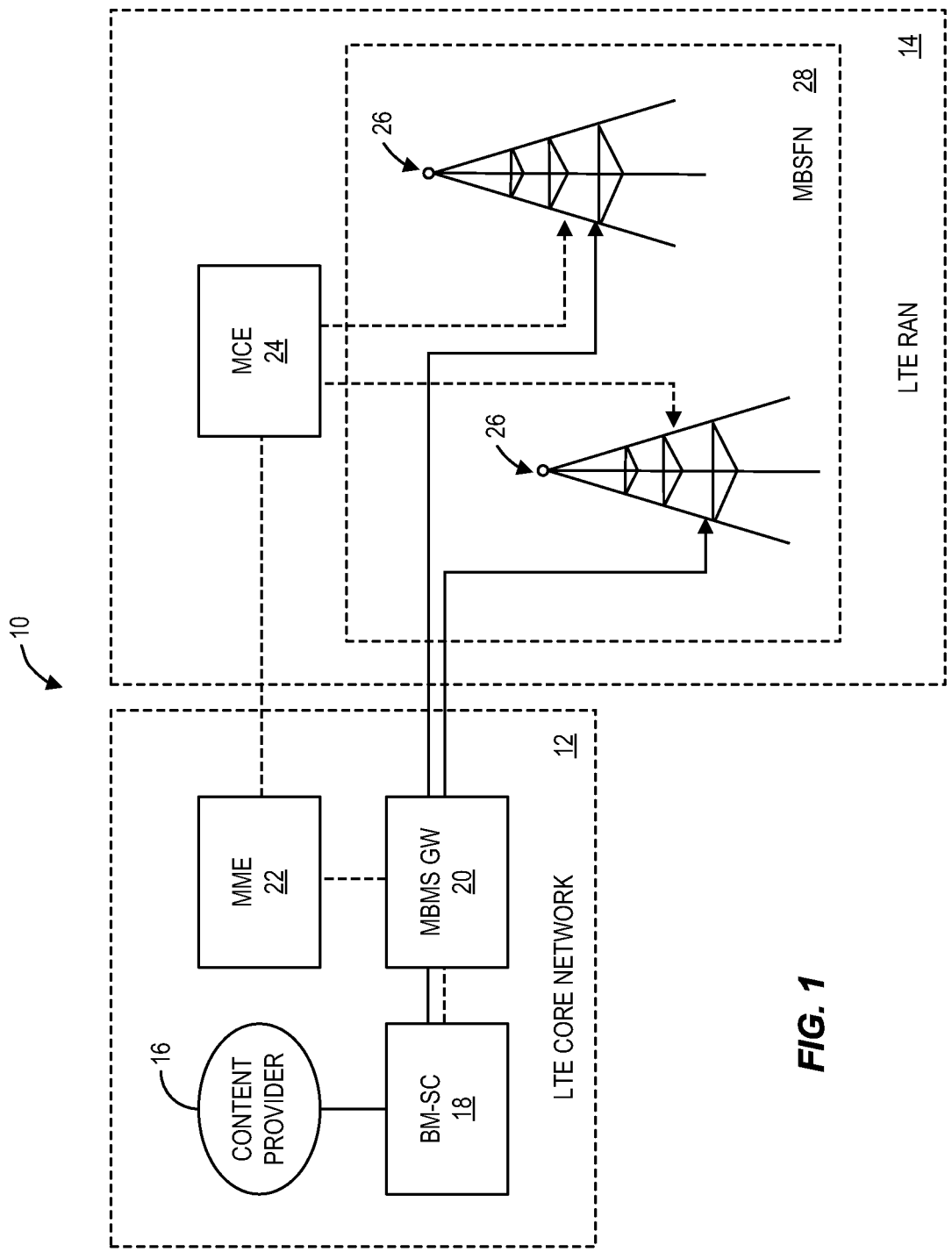
FIG. 1 is a block diagram illustrating a Long Term Evolution (LTE) network including enhanced Multimedia Broadcast and Multicast Services (eMBMS) according to one embodiment of the present disclosure.

Turning now to FIG. 1, a Long Term Evolution (LTE) cellular communications network 10 including enhanced Multimedia Broadcast Multicast Services (eMBMS) is shown according to one embodiment of the present disclosure. Note that while in this embodiment the network 10 is an LTE cellular communications network, the network may alternatively be another type of cellular communications network (e.g., WiMax). As such, while LTE terminology is sometimes used herein, the concepts disclosed herein are not limited to LTE cellular communications networks. The LTE network includes an LTE core network 12 and an LTE Radio Access Network (RAN) 14. The LTE core network 12 includes a content provider 16, a Broadcast Multicast Service Center (BM-SC) 18, an MBMS gateway 20, and a Mobility Management Entity (MME) 22 connected as shown. The content provider 16 is the source of one or more data or multimedia files, which are provided to the LTE RAN 14 via the BM-SC 18 and the MBMS gateway 20. The MME 22 acts as the key control-node for the LTE network 10, managing such functions as wireless device tracking and paging including retransmissions, bearer activation/deactivation, user authentication, and the like. Further, the MME acts as an intermediary between the base stations 26 and the BM-SC 18 to facilitate eMBMS, relating signals from the BM-SC 18 to one or more base stations in the LTE RAN 14.

The LTE RAN 14 includes an MBMS Coordination Entity (MCE) 24 and the one or more base stations 26. The MCE 24 is a logical node responsible for allocating radio resources, performing session admission control, and otherwise managing MBMS services for the LTE RAN 14. Each one of the base stations 26 is an enhanced Node B (eNB) responsible for wirelessly transmitting data to and wirelessly receiving data from one or more wireless devices in the LTE network 10. Further, in this embodiment, the base stations 26 are part of an MBMS Single Frequency Network (MBSFN) 28, such that each one of the base stations 26 is configured to transmit an identical waveform during an eMBMS data transmission. Note that while the base stations 26 are eNBs in this embodiment, one or both of the base stations 26 may alternatively be low power or small base stations (e.g., pico, micro, or home eNB) in a heterogeneous deployment. Also, while in this example the MBSFN 28 includes two base stations 26, the MBSFN 28 may include any number of base stations 26, but preferably includes two or more base stations 26.

The content provider 16 is connected to the BM-SC 18 via a user plane (UP) connection. The BM-SC 18 is connected to the MBMS gateway 20 via both a UP and a control plane (CP) connection. The MBMS gateway 20 is connected to the MME 22 via a CP connection. The MBMS gateway 20 is also connected to the one or more base stations 26 via an M1 UP connection. The MME 22 is connected to the MCE 24 via an M3 CP connection. Finally, the MCE 24 is connected to the one or more base stations 26 via an M2 CP connection.

Figure 2:
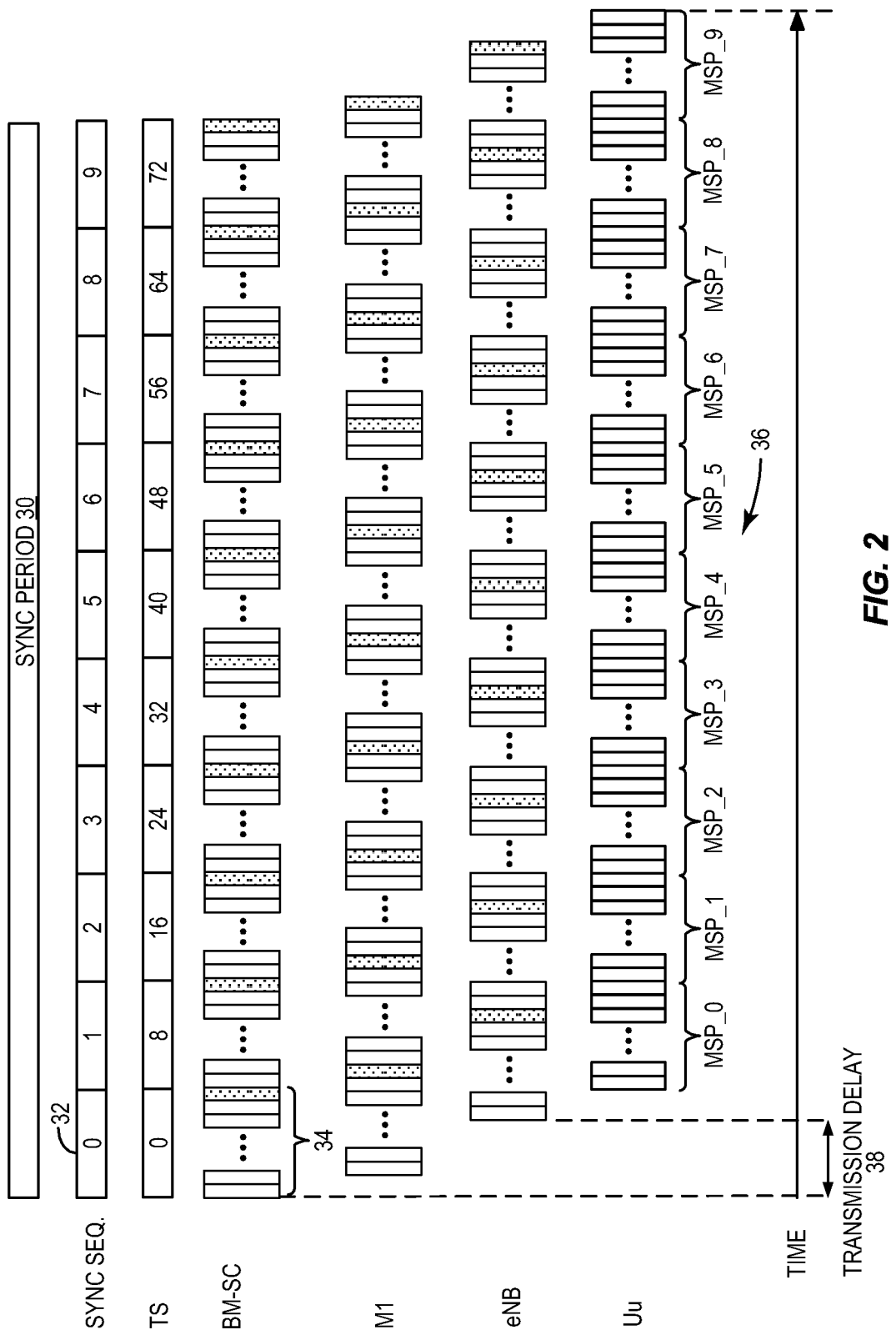
FIG. 2 is a diagram illustrating the transmission of eMBMS SYNC PDUs from a Broadcast Multicast Service Center (BM-SC) to one or more base stations for synchronization of a data transmission according to one embodiment of the present disclosure.

As discussed above, in order to transmit identical waveforms from each of the base stations 26 in the MBSFN 28, an MBMS synchronization protocol (SYNC) is implemented. Details of the MBMS SYNC protocol are described in Section 15.3.7 of 3GPP 36.300 specifications. FIG. 2 is a diagram illustrating user data flow using an eMBMS SYNC protocol according to one embodiment of the present disclosure. User data included in an MBMS session is generally sent over one or more synchronization periods 30. Notably, the beginning of each one of the synchronization periods needs to be set to the same value at both BM-SC and eNBs with respect to a common reference time between the BM-SC 18 and each of the base stations 26. The synchronization periods are further broken down into a number of synchronization sequences 32. Each one of the synchronization sequences 32 includes a number of MBMS SYNC Protocol Data Units (PDUs) 34 that are transmitted from the BM-SC 18 to the base stations 26 via the MBMS gateway 20. Similarly, data transmissions from each of the base stations 26 to one or more wireless devices in the LTE network 10 are broken down into a number of MBMS Scheduling Periods (MSPs) 36. Each of the MSPs 36 may be the same length as the synchronization sequences 32, or may have a length that is an integer multiple thereof. The MBMS SYNC PDUs 34 may be one of multiple PDU types, and may include both user data and control information (e.g., MBMS SYNC PDU type 1), or control information only (e.g., MBMS SYNC PDU types 0 and 3). Each of the MBMS SYNC PDUs 34 includes an MBMS SYNC timestamp (TS) indicating the time that the user data included with the MBMS SYNC PDUs 34 should be transmitted from the base stations 26. Notably, each MBMS SYNC timestamp (TS) is generated based on a determined delay between the base stations 26 and the BM-SC 18 in order to ensure that each of the base stations 26 transmits an identical waveform. Each one of the MBMS SYNC timestamps (TS) is used by each of the base stations 26 in the MBSFN 28 to determine the MSP in which user data included in the MBMS SYNC PDUs 34 should be transmitted from the base stations 26 such that each of the base stations 26 transmits the user data in the same MSP. By transmitting the user data in the same MSP, transmissions over the air from each one of the base stations 26 are synchronized.

As the MBMS SYNC PDUs 34 are transmitted through the LTE network 10, delays occur. These delays may occur, for example, due to latency, processing time, or the like. The delays accumulate to generate an overall transmission delay 38, which is the amount of time between the transmission of the first MBMS SYNC PDU 34 from the BM-SC 18 and the arrival of the first MBMS SYNC PDU 34 at each of the base stations 26. Because eMBMS via an MBSFN is primarily concerned with simultaneously transmitting identical waveforms from each one of the base stations, the overall transmission delay 38 must be accounted for in each one of the base stations 26 in the MBSFN. Accordingly, a delay parameter must be calculated for each of the base stations 26 in the MBSFN 28, which represents the overall transmission delay 38 between the BM-SC 18 and the respective base station 26 in the MBMSFN 28.

As discussed above, in order to account for the overall transmission delay 38 between the BM-SC 18 and each one of the base stations 26, the delay parameter representing the overall delay between each of the base stations 26 and the BM-SC 18 must be determined to construct the MBMS SYNC timestamps used to synchronize the transmission of data across the base stations 26. The longest delay parameter can then be used by the BM-SC 18 to ensure that data transmission is synchronized across the base stations 26. As discussed above, conventional MBMS solutions calculated the delay parameter by estimating network delays between the BM-SC 18 and the one or more base stations 26. However, as eMBMS is new for LTE, conventional solutions for determining the delay parameter are not applicable to eMBMS for LTE.

According to one embodiment of the present disclosure, the BM-SC 18 obtains the delay parameters for the base stations 26 by transmitting a message to the base stations 26 including a transmission time. The transmission time is generally information that defines an absolute or relative time at which the message is transmitted by the BM-SC 18. Upon receipt of the message, the base stations 26 determine a time of receipt of the message. Each base station 26 then determines the delay parameter for that base station 26 as the difference between the time of receipt of the message by the base station 26 and the time of transmission of the message by the BM-SC 18. In some embodiments, the base stations 26 transmit their respective delay parameters back to the BM-SC 18 so that the BM-SC 18 can use the delay parameters to generate MBMS SYNC timestamps that ensure adequate time for the arrival of user data at each base station 26, while simultaneously minimizing buffering of user data at each base station 26 during an MBMS data transmission.

Figure 3:
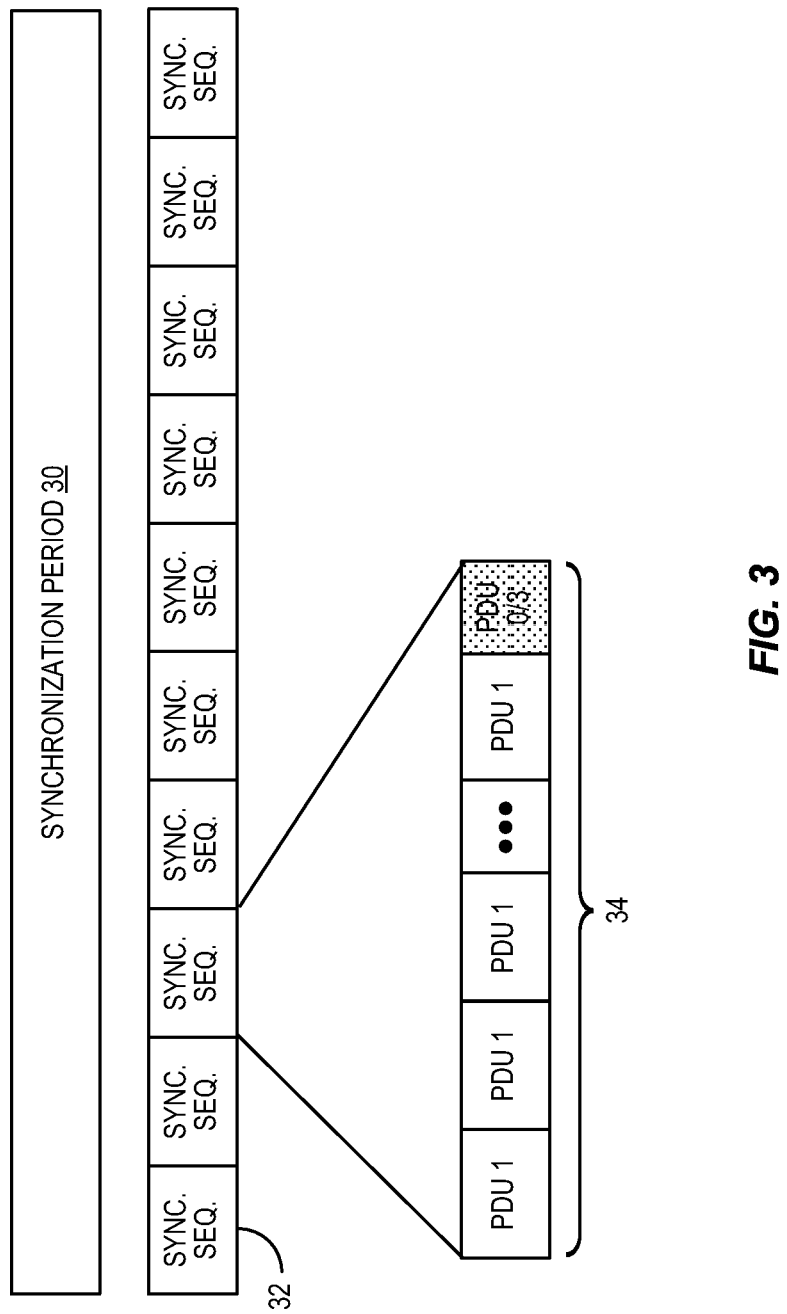
FIG. 3 is a block diagram illustrating details of the eMBMS SYNC protocol according to one embodiment of the present disclosure.

FIG. 3 is a block diagram illustrating details of the MBMS SYNC protocol frame structure. As described above, an eMBMS data transmission is broken up into one or more synchronization periods 30, which are in turn broken into a number of synchronization sequences 32. During each of the synchronization sequences 32, a number of MBMS SYNC PDUs 34 are sent from the BM-SC 18 to the base stations 26. Specifically, a number of MBMS SYNC PDUs (e.g., type 1 MBMS SYNC PDUs) may be sent including user data, followed by a control MBMS SYNC PDU (e.g., a type 0 or type 3 MBMS SYNC PDU), indicating that there is no more user data in the current synchronization sequence.

Although specific PDU types are shown as included in the MBMS SYNC PDUs 34 in FIG. 3, those of ordinary skill in the art will appreciate that the data transmission may include any number of PDU types arranged in any order, including non-standard PDU types that are not typically used in current eMBMS implementations (e.g., PDU types other than types 0, 1, 2 or 3) for transmitting additional control information, without departing from the principles of the present disclosure. The non-standard PDU types may be defined in order to carry certain control information (e.g., the transmission time), as described in further detail below. The non-standard PDU types may eventually be standardized for use with future implementations of eMBMS.

Although the user data is shown as being included in one or more of the MBMS SYNC PDUs 34, those of ordinary skill in the art will appreciate that the user data may be transmitted through the LTE network 10 in any message configuration without departing from the principles of the present disclosure. Further, although the discussion herein is primarily focused on applications involving eMBMS SYNC protocol, the principles of the present disclosure are not limited thereto, and may be used along with any synchronization protocol.

Figure 4:
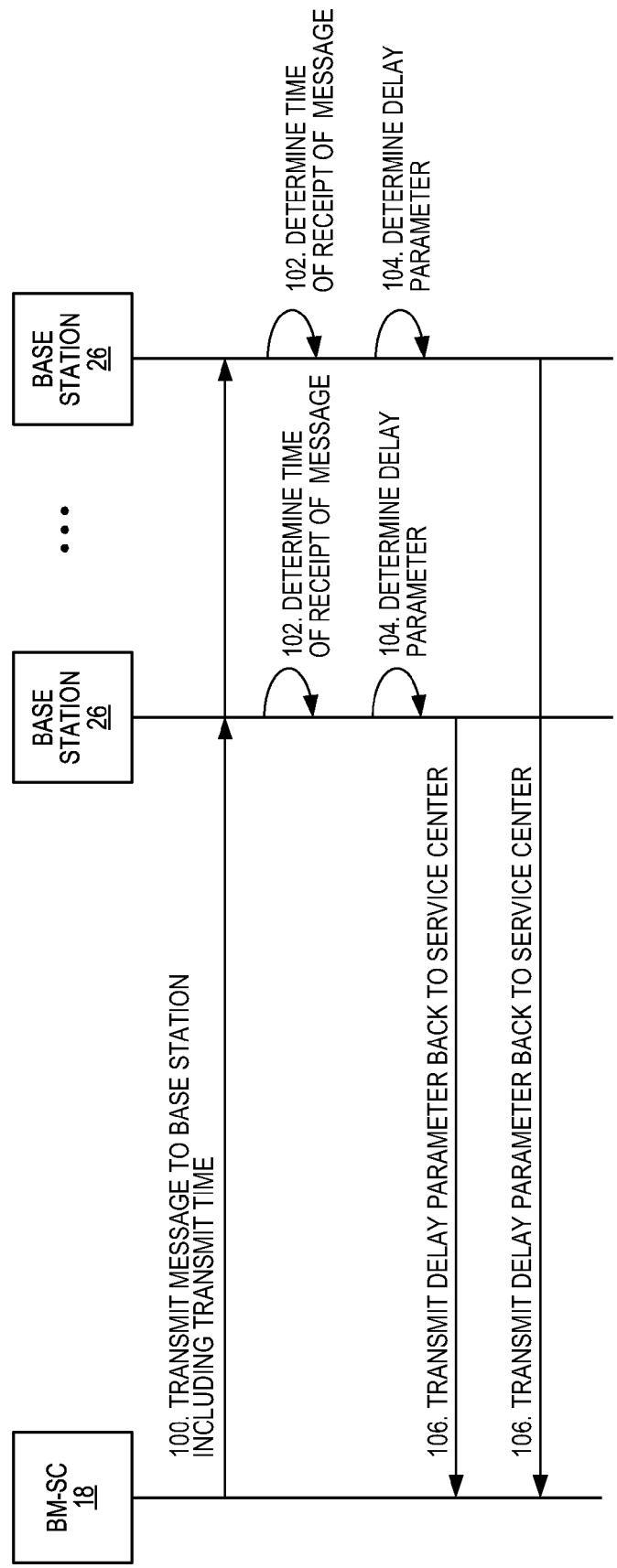
FIG. 4 is a network diagram illustrating a method of synchronizing an eMBMS data transmission according to an additional embodiment of the present disclosure.

FIG. 4 is a network diagram illustrating a method for determining the delay parameters for the delays between the BM-SC 18 and the base stations 26 in order to facilitate synchronized data transmission for an LTE network using eMBMS according to one embodiment of the present disclosure. First, the BM-SC 18 transmits a message to one or more of the base stations 26 including a transmission time of the message (step 100). Upon receipt of the message, the base stations 26 each determine a time of receipt of the message (step 102). Each base station 26 then determines the delay parameter for the base station 26 as the difference between the time of receipt of the message at the base station 26 and the transmission time of the message by the BM-SC 18 (step 104). According to one embodiment, each base station 26 transmits its delay parameter back to the BM-SC 18 (step 106).

According to one embodiment, the message may be a non-standard MBMS SYNC PDU type configured to include the transmission time, where the transmission time is separate and distinct from the MBMS SYNC timestamp for the MBMS SYNC PDU. For example, the MBMS SYNC PDU may be a dedicated MBMS SYNC PDU for transmitting the transmit time to the base stations 26 in order for the base stations 26 to determine their delay parameters. As will be appreciated by those of ordinary skill in the art, the non-standard MBMS SYNC PDU type may alternatively include other additional control data, without departing from the principles of the present disclosure.

Figure 5:
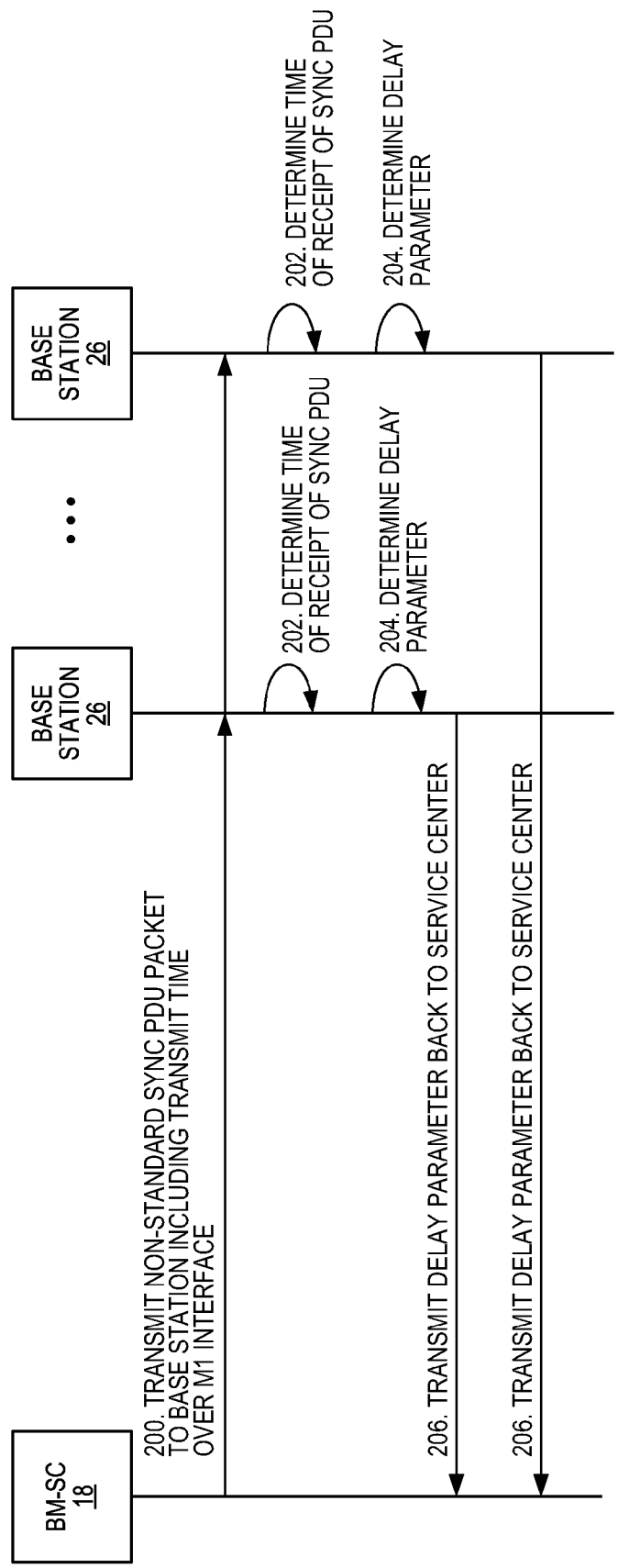
FIG. 5 is a network diagram illustrating a method of synchronizing an eMBMS data transmission according to an additional embodiment of the present disclosure.

FIG. 5 is a network diagram illustrating a method for determining the delay parameters for the base stations 26 by transmitting the transmit time using a non-standard MBMS SYNC PDU according to one embodiment of the present disclosure. First, the BM-SC 18 transmits a non-standard MBMS SYNC PDU including a transmission time via an M1 CP interface to the base stations 26 (step 200). In this embodiment, the transmission time is preferably an absolute time (e.g., a GPS time). Alternatively, the transmission time may be a relative time that is based on a common relative time source between the BM-SC 18 and the base stations 26. Upon receipt of the non-standard MBMS SYNC PDU, the base stations 26 each determine a time of receipt of the message (step 202). Each base station 26 then determines the delay parameter for the base station as the difference between the time of receipt of the non-standard MBMS SYNC PDU by the base station 26 and the transmission time specified in the non-standard MBMS SYNC PDU (step 204). According to one embodiment, the base stations 26 transmit their delay parameters back to the BM-SC 18 (step 206).

According to an additional embodiment, the message may be an MBMS SYNC PDU, and the transmission time may be included in an extension field of the MBMS SYNC PDU (e.g., a standard MBMS SYNC PDU—i.e., type 0, 1, 2, or 3). Further, the transmission time may be an absolute transmission time. In one exemplary embodiment, the transmission time is ascertained from a GPS time source. Those of ordinary skill in the art will appreciate that the absolute transmission time may be derived from any absolute time source without departing from the principles of the present disclosure.

Figure 6:
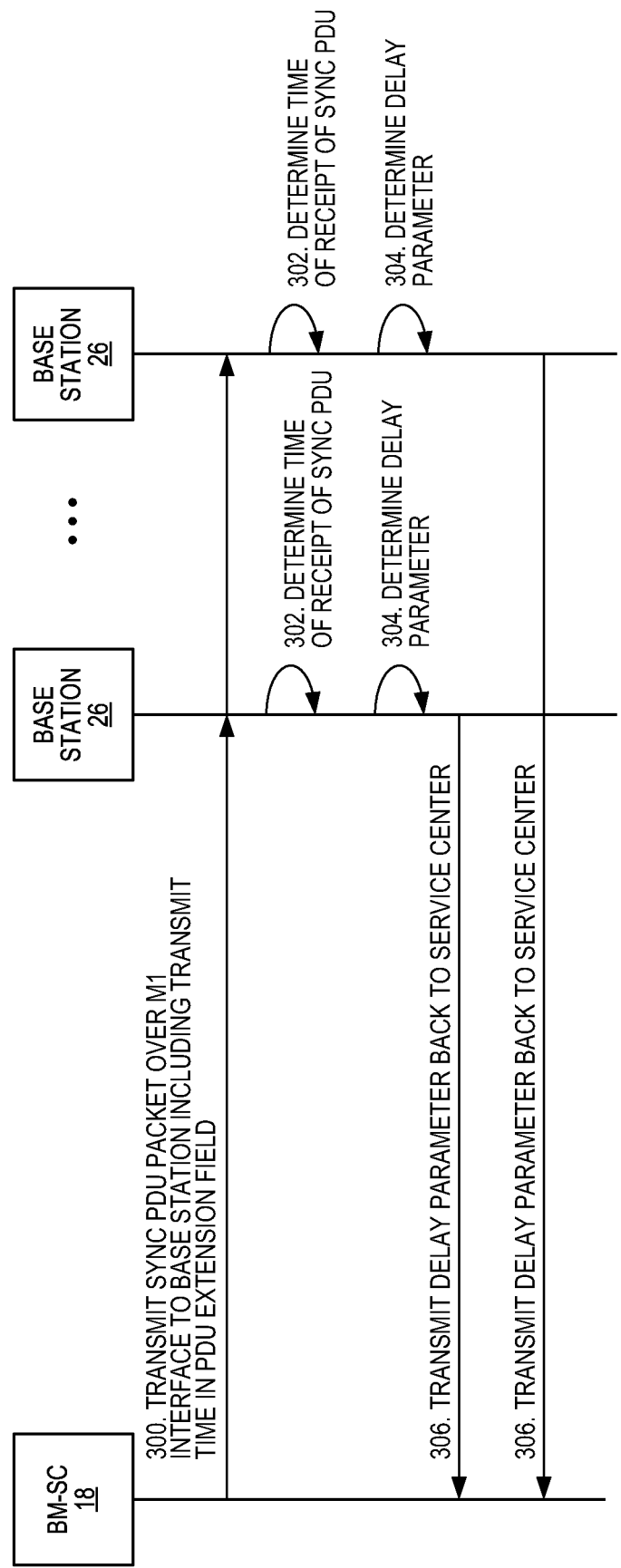
FIG. 6 is a network diagram illustrating a method of synchronizing an eMBMS data transmission according to an additional embodiment of the present disclosure.

FIG. 6 is a network diagram illustrating a method for determining the delay parameters of the base stations 26 by transmitting the transmission time in an extension field in an MBMS SYNC PDU according to one embodiment of the present disclosure. First, the BM-SC 18 transmits an MBMS SYNC PDU including a transmission time in an extension field of the MBMS SYNC PDU to the base stations 26 via an M1 CP interface (step 300). Again, in one embodiment, the transmission time is an absolute transmission time. Alternatively, the transmission time is a relative transmission time. Upon receipt of the MBMS SYNC PDU, the base stations 26 each determine a time of receipt of the message (step 302). According to one embodiment, the time of receipt is an absolute time of receipt. Alternatively, the time of receipt is a relative time of receipt. Each base station 26 then determines the delay parameter for the base station 26 as the difference between the time of receipt of the MBMS SYNC PDU at the base station 26 and the transmission time included in the extension field of the MBMS SYNC PDU (step 304). According to one embodiment, the base stations 26 transmit their delay parameters back to the BM-SC 18 (step 306).

According to another embodiment, the message may be an MBMS SYNC PDU, and the transmission time may the MBMS SYNC timestamp included in the MBMS SYNC PDU. In this embodiment, the BM-SC 18 transmits the MBMS SYNC PDU based on initial delay parameters for the base stations 26 that are set to zero. In this manner, the MBMS SYNC timestamp corresponds to the time of transmission of the MBMS SYNC PDU.

Figure 7:
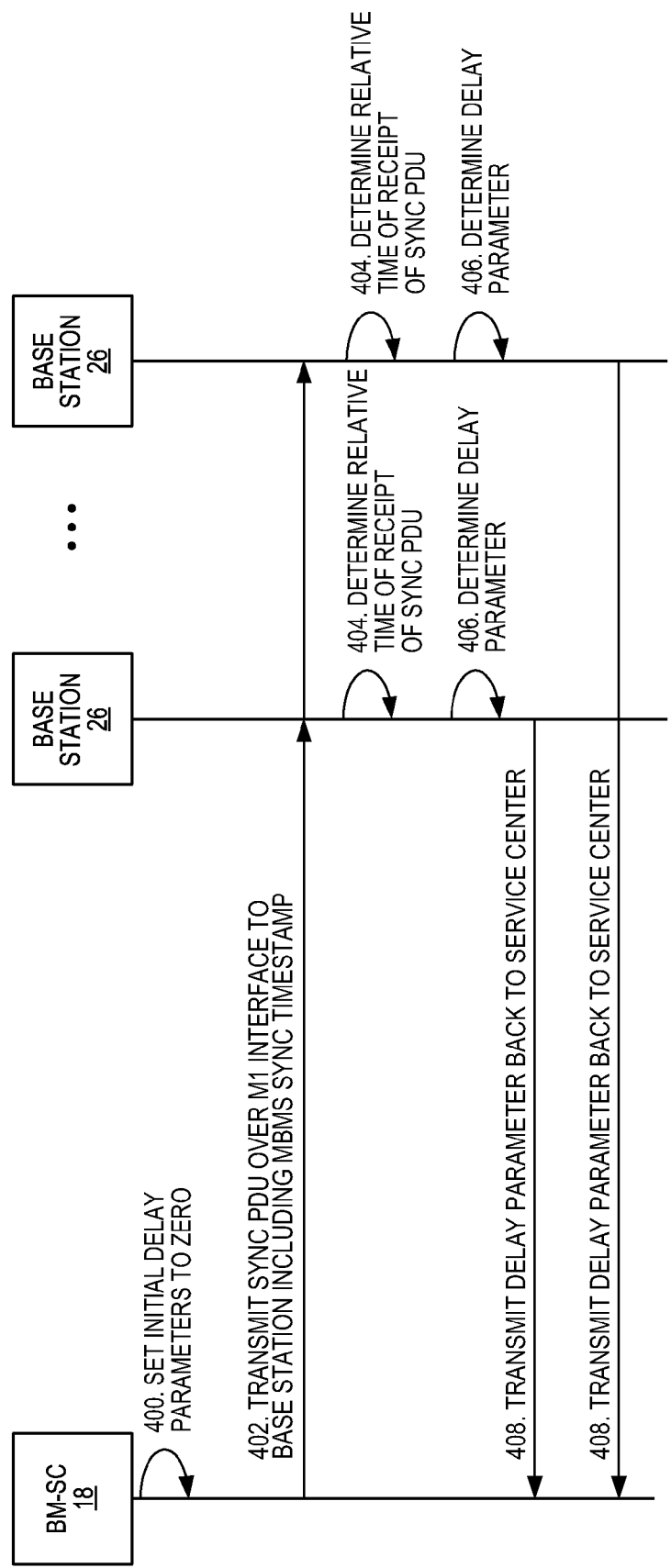
FIG. 7 is a network diagram illustrating a method of synchronizing an eMBMS data transmission according to an additional embodiment of the present disclosure.

In this regard, FIG. 7 is a network diagram illustrating a method for determining the delay parameters for the base stations 26 using the MBMS SYNC timestamp as the transmission time according to another embodiment of the present disclosure. First, the BM-SC 18 sets initial delay parameters for the base stations 26 to zero (step 400). The BM-SC 18 then transmits an MBMS SYNC PDU via an M1 UP interface according to the initial delay values (step 402). Since the initial delay parameters are set to zero, the MBMS SYNC timestamp of the MBMS SYNC PDU is the transmission time of the MBMS SYNC PDU. Accordingly, each MBMS SYNC PDU will arrive "late" at each of the base stations 26, due to the fact that the MBMS SYNC timestamp will indicate a time that has already passed. Upon receipt of the MBMS SYNC PDU, the base stations 26 each determine a time of receipt of the message (step 404). Again, according to one embodiment, the time of receipt is an absolute time of receipt. Alternatively, the time of receipt is a relative time of receipt. Because each of the base stations 26 knows the relationship of the relative time indicated by the MBMS SYNC timestamp to the absolute time, each of the base stations 26 can calculate the amount of time between the transmission of the MBMS SYNC PDU from the BM-SC 18 and the arrival of the MBMS SYNC PDU at each of the base stations 26. Each base station 26 then determines the delay parameter for the base station 26 as the difference between the time of receipt of the MBMS SYNC PDU by the base station 26 and the transmission time indicated by the MBMS SYNC timestamp included in the MBMS SYNC PDU (step 406). According to one embodiment, the base stations transmit their delay parameters back to the BM-SC 18 (step 408). The BM-SC 18 may then use the delay parameters to update the MBMS SYNC timestamps of future MBMS SYNC PDUs such that the future MBMS SYNC PDUs arrive in time to be transmitted from each of the base stations 26.

Figure 8:
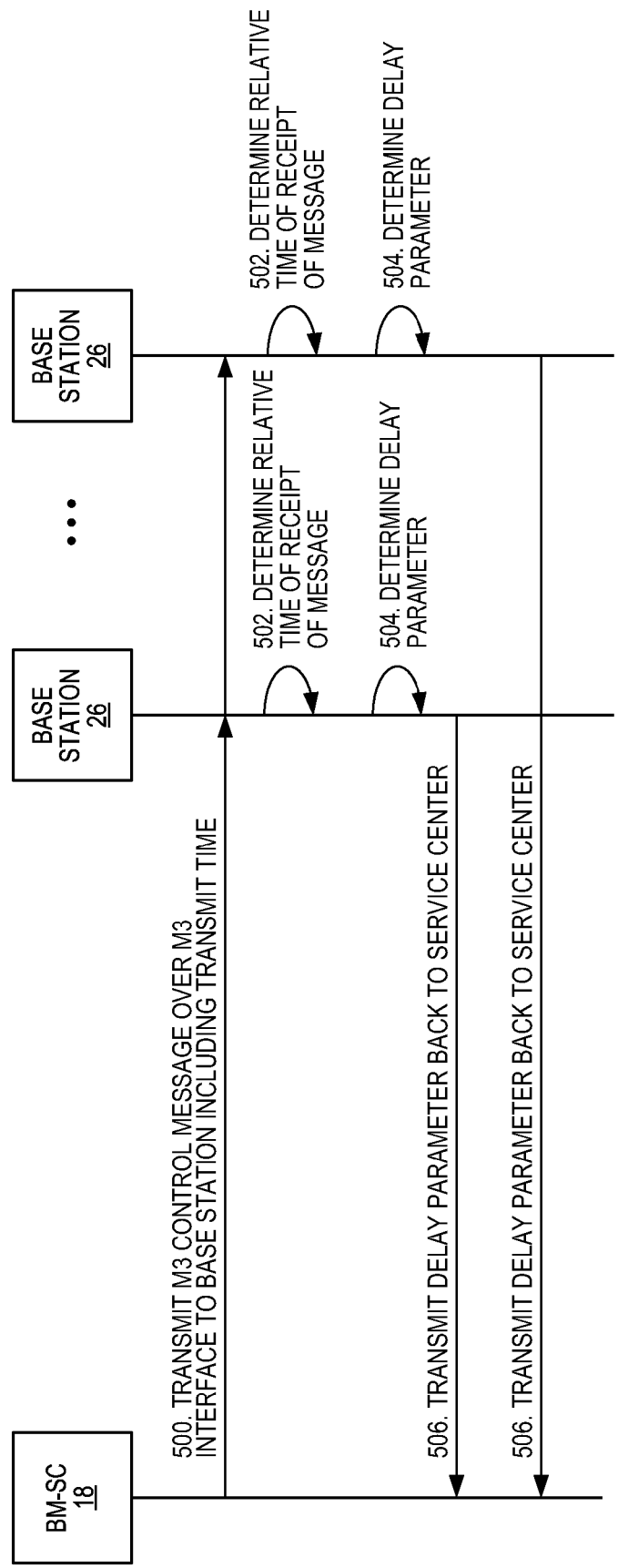
FIG. 8 is a network diagram illustrating a method of synchronizing an eMBMS data transmission according to an additional embodiment of the present disclosure.

According to another embodiment, the message may be an M3 CP message (e.g., an M3 MBMS Session Start Request message), and the transmission time may be an absolute transmission time included in the M3 CP message. In this regard, FIG. 8 is a network diagram illustrating a method for determining the delay parameters for the base stations 26 using an M3 CP message according to another embodiment of the present disclosure. First, the BM-SC 18 transmits an M3 control message including a transmission time of the M3 CP message to the base stations 26 (step 500). Unlike the messages above which pass from the BM-SC 18 to the base stations 26 via the M1 CP interface through the MBMS gateway 20, the M3 CP message passes from the BM-SC 18 to the base stations 26 via the M3 CP interface through the MBMS gateway 20, the MME 22, and the MCE 24. The transmission time is preferably an absolute transmission time, but may also be a relative transmission time. Upon receipt of the M3 CP message, the base stations 26 each determine a time of receipt of the message (step 502). The time of receipt is also preferably an absolute time of receipt, but may also be a relative time of receipt. Each base station 26 then determines the delay parameter for the base station 26 as the difference between the time of receipt of the M3 CP message by the base station 26 and the transmission time included in the M3 CP message. According to one embodiment, the base stations 26 transmit their delay parameters back to the BM-SC 18.

Figure 9B:
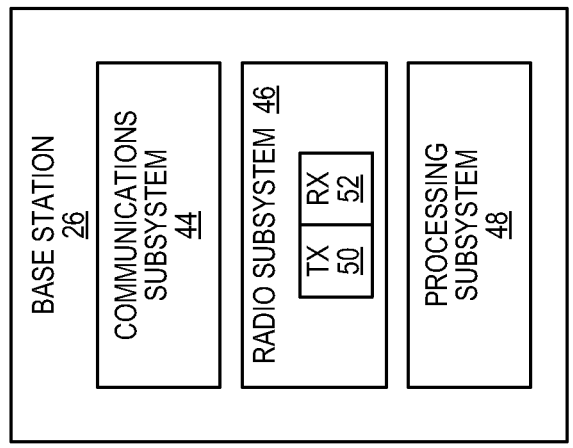
FIGS. 9A and 9B are block diagrams illustrating the structure of MB-SC and one of the base stations according to one embodiment of the present disclosure.
Figure 9A:
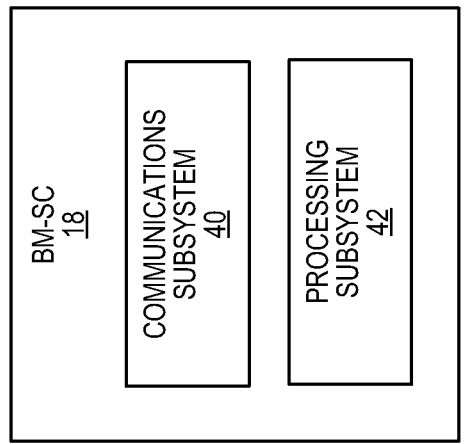

FIG. 9A is a block diagram of the BM-SC 18 according to one embodiment of the present disclosure. As illustrated, the BM-SC 18 includes a communications subsystem 40 and a processing subsystem 42. The communications subsystem 40 provides a connection, which is preferably wired, to a network. The network may be the core network of an associated cellular communications network or a public or private network through which the BM-SC 18 is capable of connecting to the associated cellular communications network.

The processing subsystem 42 may comprise, for example, one or several general-purpose or special-purpose microprocessors or other microcontrollers programmed with suitable software and/or firmware to carry out some or all of the functionality of the BM-SC 18 described herein. In addition or alternatively, the processing subsystem 42 may comprise various digital hardware blocks (e.g., one or more Application Specific Integrated Circuits (ASICs), one or more off-the-shelf digital and analog hardware components, or a combination thereof) configured to carry out some or all of the functionality of the BM-SC 18 described herein. Additionally, in particular embodiments, the described functionality of the BM-SC 18 may be implemented, in whole or in part, by the processing subsystem 42 executing software or other instructions stored on a non-transitory computer-readable medium, such as Random Access Memory (RAM), Read Only Memory (ROM), a magnetic storage device, an optical storage device, or any other suitable type of data storage components.

FIG. 9B is a block diagram of a base station 26 according to one embodiment of the present disclosure. As illustrated, the base station 26 includes a communications subsystem 44, a radio subsystem 46, and a processing subsystem 48. The communications subsystem 44 provides a connection, which is preferably wired, to the core network of the associated cellular communications network.

The radio subsystem 46 usually includes analog and, in some embodiments, digital components for wirelessly sending and receiving data to and from other devices in a cellular communications network. In particular embodiments, the radio subsystem includes a transmitter 50 and a receiver 52, which are capable of transmitting suitable information wirelessly to and receiving suitable information from other network nodes. From a wireless communications protocol view, the radio subsystem 46 implements at least part of Layer 1 (i.e., the Physical or "PHY" layer).

The processing subsystem 48 generally implements any remaining portion of Layer 1 not implemented in the radio subsystem 46 as well as functions for higher layers in the wireless communications protocol (e.g., Layer 2 (data link layer), Layer 3 (network layer), etc.). In particular embodiments, the processing subsystem 48 may comprise, for example, one or several general-purpose or special-purpose microprocessors or other microcontrollers programmed with suitable software and/or firmware to carry out some or all of the functionality of the base station 26 described herein. In addition to or alternatively, the processing subsystem 48 may comprise various digital hardware blocks (e.g., one or more ASICs, one or more off-the-shelf digital and analog hardware components, or a combination thereof) configured to carry out some or all of the functionality of the base station 26 described herein. Additionally, the above described functionality of the base station 26 may be implemented, in whole or in part, by the processing subsystem 48 executing software or other instructions stored on a non-transitory computer-readable medium, such as RAM, ROM, a magnetic storage device, an optical storage device, or any other suitable type of data storage components.

The following acronyms are used throughout this disclosure.

3GPP 3$^{rd}$ Generation Partnership Project
BM-SC Broadcast-Multicast Service Center
CP Control Plane
eMBMS Enhanced Multimedia Broadcast/Multicast Service
eNB Enhanced Node B
LTE Long Term Evolution
M1 User plane interface between the eNB and the MBMS gateway
M2 Control plane interface between the eNB and the MCE
M3 Control plane interface between the mobility management entity and the MCE
MBMS Multimedia Broadcast/Multicast Service
MBSFN MBMS Single Frequency Network
MCE Multi-Cell/Multicast Coordination Entity
MSP MBMS Scheduling Period
UP User Plane
Uu Interface between the eNB and the UE Those skilled in the art will recognize improvements and modifications to the preferred embodiments of the present disclosure. All such improvements and modifications are considered within the scope of the concepts disclosed herein and the claims that follow.

What is claimed is:

1. A service center for Multimedia Broadcast Multicast Services, MBMS, in a Long Term Evolution, LTE, cellular communications network where the service center is a Broadcast Multicast Service Center, BM-SC, for use in an enhanced Multimedia Broadcast Multicast Service, eMBMS, of the LTE cellular communications network comprising:
   a communications subsystem configured to communicably couple the service center to a core network of the cellular communication network; and
   a processing subsystem associated with the communications subsystem and configured to:
      transmit a message including a transmit time from the service center to a base station of the LTE cellular communications network via the communications subsystem where the message is an eMBMS SYNC Protocol Data Unit, PDU;
      receive a delay parameter from the base station via the communications subsystem that defines a delay between the service center and the base station in response to transmitting the message;
      transmit a second message including a second transmit time from the service center to the base station of the LTE cellular communications network via the communications subsystem where the message is the eMBMS SYNC PDU; and
      receive a second delay parameter from the base station via the communications subsystem that defines a second delay between the service center and the base station in response to transmitting the second message.

2. The service center of claim 1 wherein the transmit time is included in an extension field of the eMBMS SYNC PDU.

3. The service center of claim 1 wherein the eMBMS SYNC PDU is a non-standard eMBMS SYNC PDU type.

4. The service center of claim 1 wherein the transmit time is based on an absolute transmit time.

5. The service center of claim 1 wherein the transmit time is based on a relative transmit time.

6. The service center of claim 5 wherein the processing subsystem is further configured to set an initial delay parameter for the delay between the source center and the base station to zero, and transmit the eMBMS SYNC PDU according to the initial delay parameter such that an eMBMS SYNC timestamp included in the eMBMS SYNC PDU is the transmit time.

7. A method of operating a service center for Multimedia Broadcast Multicast Services, MBMS, in a Long Term Evolution, LTE, cellular communications network where the service center is a Broadcast Multicast Service Center, BM-SC, for use in an enhanced Multimedia Broadcast Multicast Service, eMBMS, of the LTE cellular communications network comprising:

transmitting a message including a transmit time from the service center to a base station of the LTE cellular communications network where the message is an eMBMS SYNC Protocol Data Unit, PDU;

receiving a delay parameter from the base station in response to transmitting the message;

transmit a second message including a second transmit time from the service center to the base station of the LTE cellular communications network via the communications subsystem where the message is the eMBMS SYNC PDU; and receive a second delay parameter from the base station via the communications subsystem that defines a second delay between the service center and the base station in response to transmitting the second message.

8. The method of claim 7 wherein the transmit time is included in a new extension field of the eMBMS SYNC PDU.

9. The method of claim 7 wherein the eMBMS SYNC PDU is a non-standard eMBMS SYNC PDU type.

10. The method of claim 7 wherein the transmit time is an absolute transmit time.

11. The method of claim 7 wherein the transmit time is a relative transmit time.

12. The method of claim 7 further comprising setting an initial delay parameter for the delay between the base station and the service center to zero, wherein transmitting the message comprises transmitting the eMBMS SYNC PDU according to the initial delay parameter such that an eMBMS SYNC timestamp included in the eMBMS SYNC PDU is the transmit time.

13. A base station for a cellular communications network comprising:

a communications subsystem configured to communicably couple the base station to a core network of the cellular communications network;

a radio subsystem configured to provide wireless connectivity for wireless devices served by the base station; and a processing subsystem associated with the radio subsystem and the communications subsystem and configured to:

receive a message including a transmit time from a service center for Multimedia Broadcast Multicast Services, MBMS, in the cellular communications network via the communications subsystem where the message is an eMBMS SYNC Protocol Data Unit, PDU;

determine a time of receipt of the message;

determine a delay parameter that defines a delay between the service center and the base station based on the transmit time and the time of receipt;

transmit the delay parameter to the service center via the communications subsystem;

receive a second message including a second transmit time from the service center for the MBMS, in the cellular communications network via the communications subsystem where the second message is the eMBMS SYNC PDU;

determine a second time of receipt of the second message;

determine a second delay parameter that defines a second delay between the service center and the base station based on the second transmit time and the second time of receipt; and transmit the second delay parameter to the service center via the communications subsystem.

14. The base station of claim 13 wherein the cellular communications network is a Long Term Evolution, LTE, cellular communications network, and the service center is a Broadcast Multicast Service Center, BM-SC, for use in an enhanced Multimedia Broadcast Multicast Service, eMBMS, of the LTE cellular communications network.

15. The base station of claim 13 wherein the transmit time is included in an extension field of the eMBMS SYNC PDU.

16. The base station of claim 13 wherein the eMBMS SYNC PDU is a non-standard eMBMS SYNC PDU type.

17. The base station of claim 13 wherein the transmit time is an absolute transmit time.

18. The base station of claim 13 wherein the transmit time is a relative transmit time.

19. The base station of claim 18 wherein the transmit time is included in the message as an eMBMS SYNC timestamp with a zero delay parameter.

20. A method of operating a base station for a cellular communications network comprising:

receiving a message including a transmit time from a service center for Multimedia Broadcast Multicast Services, MBMS, in the cellular communications network where the message is an eMBMS SYNC Protocol Data Unit, PDU;

determining a time of receipt of the message;

determining a delay parameter that defines a delay between the service center and the base station based on the transmit time and the time of receipt;

transmitting the delay parameter to the service center;

receiving a second message including a second transmit time from the service center for the MBMS, in the cellular communications network via the communications subsystem where the second message is the eMBMS SYNC PDU;

determining a second time of receipt of the second message;

determining a second delay parameter that defines a second delay between the service center and the base station based on the second transmit time and the second time of receipt; and transmitting the second delay parameter to the service center via the communications subsystem.

21. The method of claim 20 wherein the cellular communications network is a Long Term Evolution, LTE, cellular communications network, and the service center is a Broadcast Multicast Service Center, BM-SC, for use in an enhanced Multimedia Broadcast Multicast Service, eMBMS, of the LTE cellular communications network.

22. The method of claim 20 wherein the transmit time is included in an extension field of the eMBMS SYNC PDU.

23. The method of claim 20 wherein the eMBMS SYNC PDU is a non-standard eMBMS SYNC PDU type.

24. The method of claim 20 wherein the transmit time is an absolute transmit time.

25. The method of claim 20 wherein the transmit time is a relative transmit time.

26. The method of claim 25 wherein the transmit time is included in the message as an eMBMS SYNC timestamp with a zero delay parameter.

\* \* \* \* \*